(12) United States Patent
Ferren et al.

(10) Patent No.: US 8,254,957 B2
(45) Date of Patent: Aug. 28, 2012

(54) CONTEXT-BASED LIMITATION OF MOBILE DEVICE OPERATION

(75) Inventors: Bran Ferren, Beverly Hills, CA (US); Robert Curtiss Francis, Castaic, CA (US); Clint B. Hope, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 12/646,658

(22) Filed: Dec. 23, 2009

(65) Prior Publication Data

US 2010/0317336 A1   Dec. 16, 2010

Related U.S. Application Data

(60) Provisional application No. 61/187,520, filed on Jun. 16, 2009.

(51) Int. Cl.
*H04W 24/00* (2009.01)
(52) U.S. Cl. ............. 455/456.1; 455/456.4; 455/419; 455/26.1
(58) Field of Classification Search ............ 455/419, 455/26.1, 456.1, 456.4
See application file for complete search history.

(56) References Cited

U.S. PATENT DOCUMENTS

| | | | |
|---|---|---|---|
| 6,272,545 B1 | 8/2001 | Flanagin et al. | |
| 6,282,508 B1 | 8/2001 | Kimura et al. | |
| 6,530,083 B1 | 3/2003 | Liebenow | |
| 6,633,274 B1 | 10/2003 | Yokota et al. | |
| 6,753,842 B1 | 6/2004 | Williams et al. | |
| 7,123,247 B2 | 10/2006 | Morita | |
| 7,190,338 B2 | 3/2007 | Kubota et al. | |
| 7,239,742 B2 | 7/2007 | Ohtani et al. | |
| 7,424,674 B1 | 9/2008 | Gross et al. | |
| 7,581,180 B2 | 8/2009 | Masui et al. | |
| 7,782,333 B2 | 8/2010 | Yamaguchi et al. | |
| 2002/0040442 A1 | 4/2002 | Ishidera | |
| 2002/0119788 A1 | 8/2002 | Parupudi et al. | |
| 2002/0173295 A1 | 11/2002 | Nykanen et al. | |
| 2002/0180723 A1 | 12/2002 | Siwinski | |
| 2003/0126330 A1 | 7/2003 | Balasuriya | |
| 2003/0200481 A1 | 10/2003 | Stanley | |
| 2004/0203768 A1 | 10/2004 | Ylitalo et al. | |

(Continued)

FOREIGN PATENT DOCUMENTS

EP   1217792   6/2002

(Continued)

OTHER PUBLICATIONS

First Office Action for German Patent Application No. 10 2010 023 692.6-31 mailed Mar. 18, 2011.

(Continued)

*Primary Examiner* — Barry Taylor
(74) *Attorney, Agent, or Firm* — Blakely, Sokoloff, Taylor & Zafman LLP

(57) ABSTRACT

Context-based limitation of mobile device operation. An embodiment of a method includes receiving a request for a function of a mobile device. The method further includes obtaining data regarding a context of the mobile device, and determining a current context for the mobile device based on the obtained data. The method includes determining whether the function of the mobile device should be limited at least in part the current context of the mobile device; and responding to the request for the function based on the determination regarding the limitation of the function.

18 Claims, 5 Drawing Sheets

U.S. PATENT DOCUMENTS

| | | | |
|---|---|---|---|
| 2004/0257316 A1 | 12/2004 | Nguyen | |
| 2005/0044423 A1 | 2/2005 | Mellmer et al. | |
| 2005/0110717 A1 | 5/2005 | Iwamura | |
| 2005/0124389 A1 | 6/2005 | Yang | |
| 2005/0283724 A1 | 12/2005 | Griffin | |
| 2006/0123081 A1 | 6/2006 | Baudino et al. | |
| 2006/0132474 A1 | 6/2006 | Lam | |
| 2006/0206733 A1 | 9/2006 | Ono | |
| 2006/0236144 A1 | 10/2006 | Chao | |
| 2006/0267972 A1 | 11/2006 | Yi | |
| 2007/0004393 A1 | 1/2007 | Forsberg et al. | |
| 2007/0021108 A1 | 1/2007 | Bocking et al. | |
| 2007/0082712 A1 | 4/2007 | Ikeda et al. | |
| 2007/0226649 A1 | 9/2007 | Agmon | |
| 2008/0055318 A1 | 3/2008 | Glen | |
| 2008/0220715 A1* | 9/2008 | Sinha et al. | 455/1 |
| 2008/0243808 A1 | 10/2008 | Rieman et al. | |
| 2008/0253345 A1 | 10/2008 | Sanguinetti | |
| 2008/0261593 A1 | 10/2008 | Wong et al. | |
| 2008/0288955 A1 | 11/2008 | Brockway et al. | |
| 2009/0019131 A1 | 1/2009 | Ganesan | |
| 2009/0070030 A1 | 3/2009 | Isoda et al. | |
| 2009/0070606 A1 | 3/2009 | Chen et al. | |
| 2009/0163226 A1* | 6/2009 | Karkaria et al. | 455/456.1 |
| 2009/0165145 A1 | 6/2009 | Haapsaari et al. | |
| 2009/0286557 A1* | 11/2009 | Clipsham | 455/457 |
| 2009/0322800 A1 | 12/2009 | Atkins | |
| 2010/0062788 A1* | 3/2010 | Nagorniak | 455/456.1 |
| 2010/0277512 A1 | 11/2010 | Shen et al. | |
| 2010/0298048 A1 | 11/2010 | Yamazaki | |
| 2010/0318903 A1 | 12/2010 | Ferren | |
| 2011/0074765 A1 | 3/2011 | Oterhals et al. | |
| 2011/0080419 A1 | 4/2011 | Croxford et al. | |

FOREIGN PATENT DOCUMENTS

| | | |
|---|---|---|
| EP | 1204262 | 3/2004 |
| EP | 1445923 | 8/2004 |
| EP | 1737193 | 12/2006 |
| EP | 1903759 | 3/2008 |
| EP | 2076001 | 7/2009 |
| GB | 2373914 | 10/2002 |
| GB | 2397196 | 7/2004 |
| GB | 2421147 | 6/2006 |
| JP | 2003-284138 | 10/2003 |
| JP | 2006-236159 | 9/2006 |
| JP | 2007-219835 | 8/2007 |
| JP | 2008-193546 | 8/2008 |
| JP | 2009-49564 | 3/2009 |
| JP | 2010011334 | 1/2010 |
| JP | 2010107784 | 5/2010 |
| WO | WO-2005/101239 | 10/2005 |
| WO | WO-2007038281 | 4/2007 |
| WO | WO-2008067261 | 6/2008 |
| WO | WO2010/133770 | 11/2010 |
| WO | WO2010/147610 | 12/2010 |

OTHER PUBLICATIONS

Combined Search Report and Examination Report for United Kingdom Patent Application 1009711.1 issued Sep. 23, 2010 mailed Oct. 22, 2010., 17 pages.

Non-final Office Action for United Kingdom Patent Application No. GB1009714.5 mailed Aug. 18, 2010.

Non-final Office Action for United Kingdom Patent Application No. GB1009708.7 mailed Aug. 25, 2010.

Non-Final Office Action for U.S. Appl. No. 12/646,837, Mailed Jun. 6, 2011, 12 pages.

Notice of Preliminary Rejection for Korean Patent Application No. 10-2010-57105, Mailed Jun. 23, 2011, 5 pages.

Non-Final Office Action for U.S. Appl. No. 11/020,397, Mailed Sep. 11, 2007, 12 pages.

Final Office Action for U.S. Appl. No. 11/020,397, Mailed Jun. 30, 2008, 13 pages.

Non-final Office Action for United Kingdom Patent Application No. GB1009714.5 mailed Oct. 18, 2011.

First Office Action for German Patent Application No. 10 2010 023 691.8-31 mailed Dec. 2, 2011.

Office Action from UK1009708.7 mailed Jan. 9, 2012, 2 pgs.

Office Action mailed Jun. 6, 2012, in U.S. Appl. No. 12/646,730, 20 pages.

First Official Action mailed Apr. 10, 2012 (+ English translation), in Japanese Patent Application No. 2010-135660, 6 pages.

Official Action mailed May 22, 2010 (+ English translation), in Japanese Patent Application No. 2010-135662, 6 pages.

Combined search and examination report mailed May 2, 2012, in Great Britain Patent Application No. GB1009714.5, 3 pages.

International Search Report and Written Opinion recieved for International Application No. PCT/US2009/069927, mailed Jul. 29, 2010, 9 pages.

Office Action mailed Apr. 24, 2012, in U.S. Appl. No. 13/376,618, 11 pages.

* cited by examiner

Table of Functional Limitations 500

| Function | Class of Operation | Unknown Location? | Restricted Locations | Restricted Circumstances | In Motion? | Prohibition Signal? |
|---|---|---|---|---|---|---|
| Camera | Personal | Prohibited | Work loc 1 Work loc 2 | None | Allowed | Yes |
| Text messaging | Work or personal | Allowed | | Auto driving | Prohibited - waiver | None |
| Ringer | Work or personal | Allowed | Theater Church | Office meeting | Allowed | Yes |
| Function 4 | [Data] | [Data] | [Data] | [Data] | [Data] | [Data] |
| Function 5 | [Data] | [Data] | [Data] | [Data] | [Data] | [Data] |
| Function 6 | [Data] | [Data] | [Data] | [Data] | [Data] | [Data] |
| Function 7 | [Data] | [Data] | [Data] | [Data] | [Data] | [Data] |

Fig. 5

CONTEXT-BASED LIMITATION OF MOBILE DEVICE OPERATION

RELATED APPLICATION

This application is related to and claims priority to U.S. Provisional Patent Application Ser. No. 61/187,520, filed Jun. 16, 2009 and entitled "Multi-Mode Handheld Electronic Device", which is incorporated herein by reference.

TECHNICAL FIELD

Embodiments of the invention generally relate to the field of electronic devices and, more particularly, to a method and apparatus for context-based limitation of mobile device operation.

BACKGROUND

Mobile devices, including cellular phones, smart phones, personal digital computers, and other similar devices, allow for versatile operation in many different environments. Such devices allow for a great variety of different functions for various purposes, including business and personal use.

The versatility of mobile devices allows the opportunity for new activities in different environments. For example, many kinds of work activities that previously would have required a larger computer or an office setting may now be handled in many locations, or during travel. In addition, there are methods of communication using mobile devices that allow an individual to transfer and share documents and other data quickly and efficiently.

However, with the new functionality, persons may access mobile devices in inappropriate circumstances. For example, individuals may access cell phones or similar communications devices in circumstances that interfere with others, or in locations or circumstances in which use of the device is not allowed, dangerous, and/or possibly illegal. This is made more complex because of the mix of uses to which mobile devices are applied.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 is an illustration of a functional limitation table for a mobile device or system.

DETAILED DESCRIPTION

Figure 1:
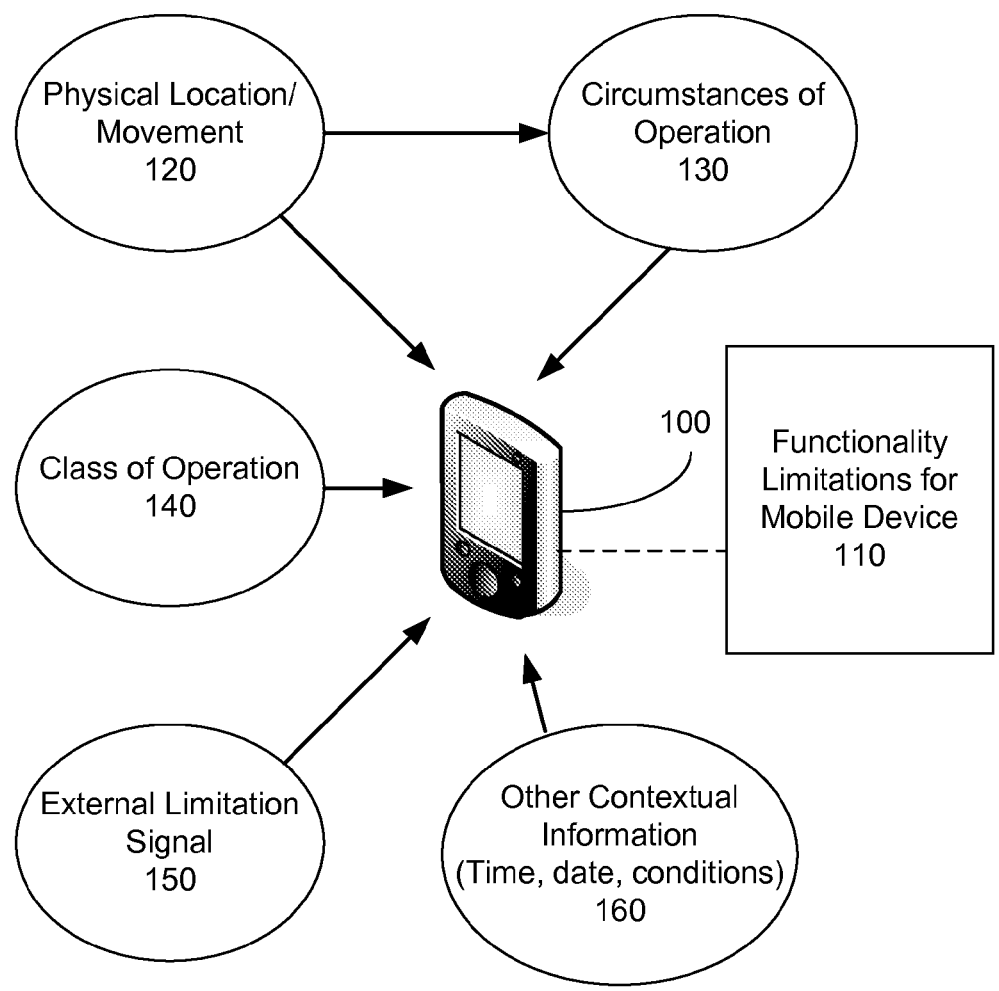
FIG. 1 is a illustration of an embodiment of context-based limitations on functionality for a mobile device.

Embodiments of the invention are generally directed to context-based limitation of mobile device function.

As used herein:

"Mobile device or system" means a mobile electronic device or system including a cellular telephone, smart phone, personal digital device, or handheld computer.

In some embodiments, a mobile device or system automatically limits some or all functionality of the mobile device or system based on the current device or system context, where the context of the device or system includes the type of usage, the physical location, and the circumstances of usage. In some embodiments, the limitation of a function of a mobile device or system may in some contexts be a prohibition or disabling of the function, and in some contexts may be an allowance of the function with certain restrictions.

In some embodiments, the current context of a mobile device or system includes one or more factors, where the factors may include a class of operation of the mobile device (such as business or personal use), whether the physical location is known, whether the current physical location is prohibited for a function, what the circumstances of use of the mobile device are (such as the use of the mobile device in a business meeting), whether the mobile device is in motion, and whether the mobile device is receiving a beacon or other signal indicting a prohibited function. The beacon may include, but is not limited to, a WiFi signal or other protocol signal.

In some embodiments, a mobile device or system determines a physical location for the device or system using a location determination technology, including, but not limited to, a GPS (global positioning satellite) receiver and circuit, a network location (for example, the detection of a local wireless network within a work environment), or other detected location data. In some embodiments, a velocity of the device may be determined by the same technology, such as by GPS technology, or by another technology.

In some embodiments, a mobile device or system may utilize the physical location of the device or system as a factor in determining circumstances of usage. For example, the mobile device may determine from the physical location that the mobile device is being used within a work environment, which may result in a first set of functions being limited or locked, or that the mobile device may determine that the mobile device is outside of the work environment, which may result in a second set of functions being limited or locked. In some embodiment, a mobile device may access other data to assist in determining circumstances, including access of the calendar of the user to determine an expected circumstance at a particular time.

In some embodiments, functionality of a mobile device or system is locked based on a table or other data format explicitly defining certain contexts in which functions are limited, such as regions in which all or particular device operations are prohibited (such as defense agencies or government facilities) and regions in which certain functions are limited. In some embodiments, a mobile device may lock as a preventative measure if the mobile device is transported to an "unexpected" location, as determined from prior usage patterns and calendar entries, because the unexpected location may indicate theft or unauthorized use. In this event, the mobile device may additionally report its location to a predetermined service or phone number to aid in its recovery.

In one example, a mobile device or system may be configured to address the increasing scrutiny applied to cell phones and PDAs with onboard cameras by prohibiting or restricting the photographic function as required. In this example, the mobile device is equipped with a disabling device or feature that operates to lock the photographic functionality of the mobile device when the mobile device is within a prohibited or restricted zone. A prohibited or restricted zone may be defined based on device location (determined by GPS or other location determining technology) or may be indicated by beaconing, in which, for example, an authorizing or prohibiting signal is broadcast over a short range wireless network. The limitation of the photographic function may allow for increased security in sensitive corporate and government environments, such as R&D facilities and courtrooms. In another example, a location may be a live performance theater or movie theater, where attendees are not authorized to record performances or shows.

In some embodiments, the limitation on functionality of a mobile device may be made tamper-resistant through well-known means of protecting the integrity of data, including, but not limited to, integrity verification of access control lists or tables.

FIG. 1 is an illustration of an embodiment of context-based limitations on functionality for a mobile device or system. In some embodiments, a mobile device 100 includes functional limitations 110, where such limitations are dependent on the context of any usage. In some embodiments, the context elements that may affect the mobile devices include: The physical location and movement 120 (including velocity of movement) of the mobile device, as determined by location determining hardware and software, including GPS operation; the circumstances of operation of the mobile device 130, which may be based in part on the physical location and movement 120 of the mobile device 100 and other data; the class of operation of the mobile device, including personal and business usages 140; external limitation signals 150, including beacons and other signals that are broadcast to inform mobile devices of certain function prohibitions; and other contextual information received by the mobile device 160, including, for example, the time of day, the date, and external conditions experienced by the mobile device.

Figure 2:
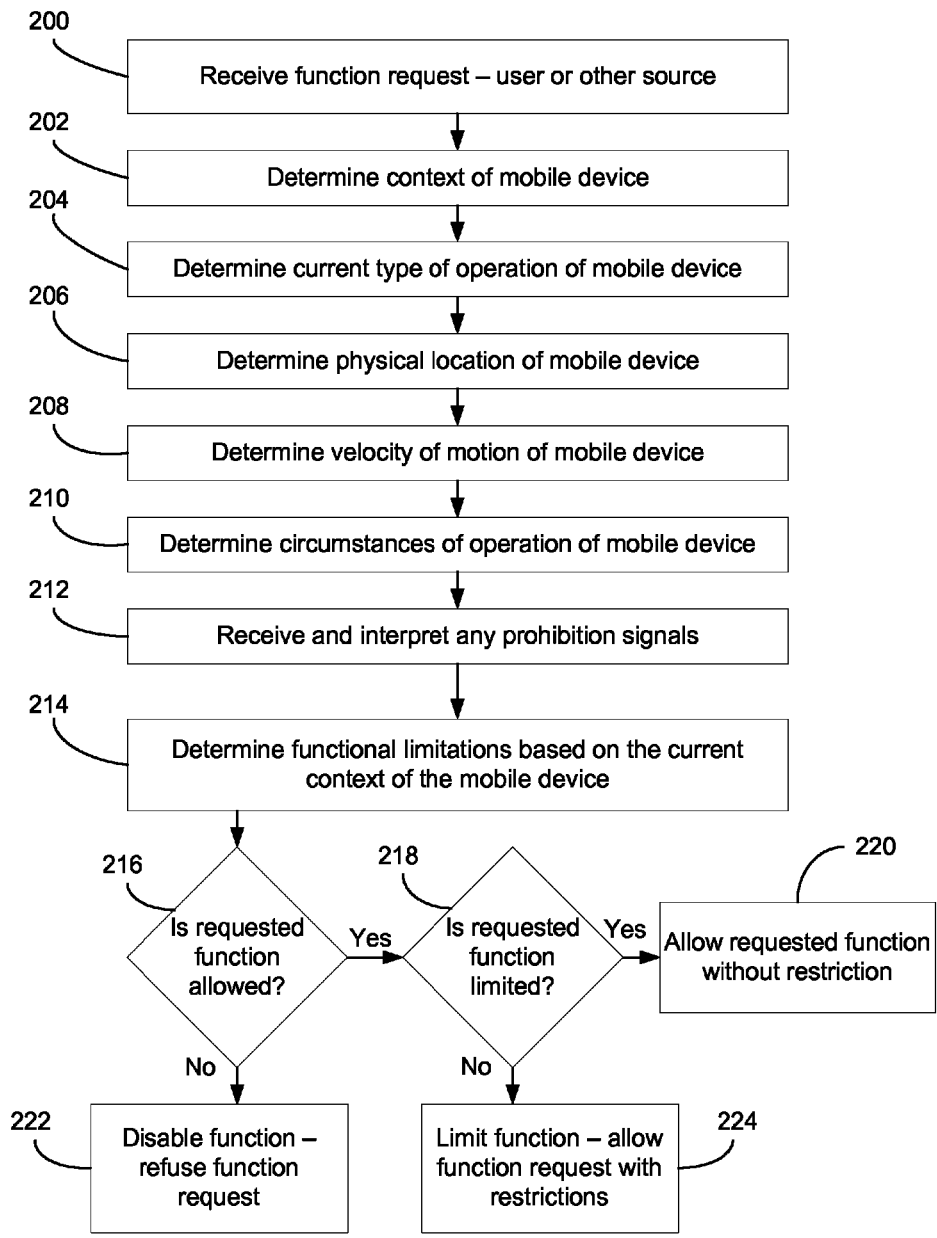
FIG. 2 is a flowchart to illustrate an embodiment of a process for limiting functionality of a mobile device or system based on the context of the mobile device or system.

FIG. 2 is a flowchart to illustrate an embodiment of a process for limiting functionality of a mobile device or system based on the context of the mobile device or system. The processes in such flowchart are not required and may be performed in varying order depending on the embodiment and on the particular set of occurrences. In this illustration, a mobile device receives a function request 200. The function request may be a request from a user or external apparatus, or may be a request for an internal element of the mobile device. In a first example, a user may attempt to use the camera function. In a second example, an element of the mobile device may request activation of a ringer or other audible signal in response to an incoming call or other event. In some embodiments, the mobile device may determine, collect, or retrieve previously stored context information 202 (generally referred to as determining the context) in order to determine whether the request should be denied, allowed, or allowed with restrictions.

In some embodiments, the determination of the context may include the following: The mobile device may determine a current type or class of operation of the mobile device 204, such as a business operation or a personal operation. The mobile device may determine physical location information 206, such as GPS location data, location determined by network link, or location determined by an external location beacon or other signal received by the mobile device. The mobile device may determine velocity information 208, such as velocity information determined based on GPS signals, which may, for example, be used to determine whether the mobile device is being used in a moving vehicle. The mobile device may determine the circumstances of operation of the mobile device 210, which may include use of location and velocity information, as well as information such as calendar data. Circumstances may include, but are not limited to, the use of the mobile device in a business meeting or the use of the mobile device in a moving vehicle such as an automobile. The mobile device may receive and interpret prohibition or restriction signals 212, such as signals prohibiting use of a camera or signals prohibiting audible signals (such as ringers).

In some embodiments, the mobile device determines the limitations for the requested function based at least in part on the current context of the mobile device 214. If the requested function is not allowed with the current context of the mobile device 216, the function is disabled and the request is denied 222. If the requested function is allowed but limited 218, the function is enabled with restrictions 224. If the requested function is not limited, the requested function is allowed without restriction 220.

Figure 3:
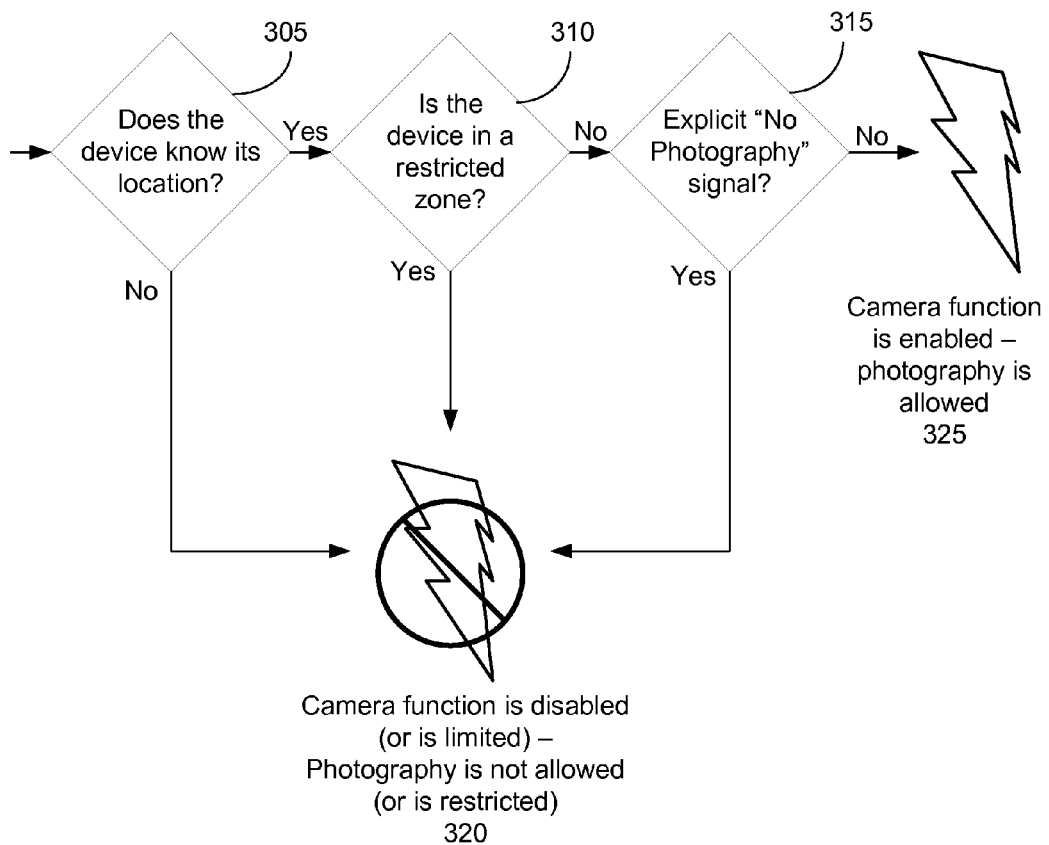
FIG. 3 is an illustration of the limitation of functionality of a camera function of a mobile device.

FIG. 3 is an illustration of limitation of functionality of a camera function of a mobile device. In a particular example, a function of a mobile device may be a camera function, and a user may attempt to engage the camera to take a photograph. In some embodiments, if the device does not know its location 305, such as when the mobile device cannot receive a GPS signal, the camera function may be disabled 320 because the mobile device is unable to determine that the mobile device is outside of any restricted zones. If the device is within a restricted zone 310, the camera function may be disabled or limited 320. In some cases, the camera may be completely disabled, such as a restricted government location. In some case, the camera may be restricted such that the flash is not usable, such as in locations that allow non-flash photography only, such as concerts and sporting events or in museums. If the camera receives an explicit "no photography" or restricted photograph beacon or other signal 315, the camera function may be disabled or limited 320. If not, then the camera function is enabled and photograph is allowed without restriction 325.

Figure 4:
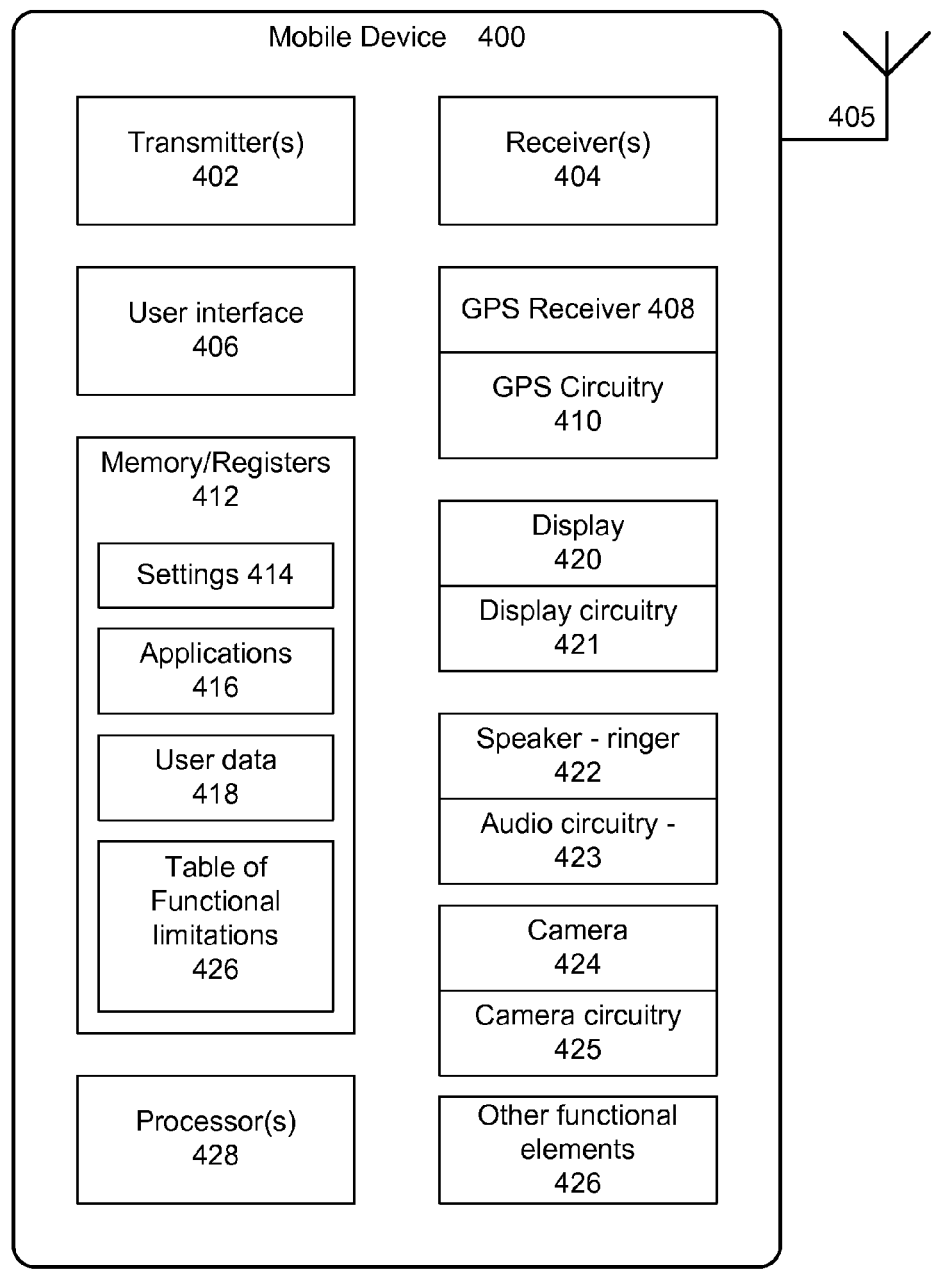
FIG. 4 illustrates an embodiment of a mobile device or system.

FIG. 4 illustrates an embodiment of a mobile device or system. In this illustration, a mobile device 400 includes elements for limitation of functions of the mobile device based on a current context of the mobile device. In some embodiments, a mobile device 400 includes one or more transmitters 402 and receivers 404 for transmitting and receiving data. In some embodiments, the mobile device includes one or more antennas 405 for the transmission and reception of data, where the antennas may include dipole and monopole antennas. The mobile device 400 may further include a user interface 406, including, but not limited to, a graphical user interface (GUI). The mobile device 400 may further include one or more elements for the determination of physical location or velocity of motion, including, but limited to, a GPS receiver 408 and GPS circuitry 410.

The mobile device 400 may further include one or more memories or sets of registers 412, which may include non-volatile memory, such as flash memory, and other types of memory. The memory or registers 412 may include one more groups of settings for the device 414, including default settings, user-set settings established by user of the mobile device, and enterprise-set settings established by an enterprise, such as an employer, who is responsible for IT (information technology) support. The memory 412 may further include one or more applications 416, including applications that support or control operations to limit the functionality of the mobile device based on the context of the mobile device. The memory 412 may further include user data 418, including data that may affect limitations of functionality of the mobile device and interpretations of the circumstances of use of the mobile device. For example, the user data 418 may include calendar data that may be used by the mobile device to interpret what circumstances are expected at certain times. In a possible example, a calendar entry regarding a meeting may be used to determine that the mobile device is present in a business need and that certain functions should be limited. The memory 412 may further include a table, database, or data structure to reflect the functional limitations of the device depending on the context for the mobile device 426. An example of such a table is illustrated in FIG. 5.

The mobile device may include various elements that are related to the functions of the system that are subject to limitation. For example, the mobile device may include a display 420 and display circuitry 421 (with certain display items being limited in certain contexts); a speaker 422 and audio circuitry 423 including audible signaling (ringers) (which may turned off or limited in volume in certain contexts); a camera 424 and camera circuitry 425 (which may be limited in certain contexts, such as shown in FIG. 3); and other functional elements 426. The mobile device may further include one or more processors 428 to execute instructions, including instructions regarding the limitation of mobile device functions.

FIG. 5 is an illustration of a functional limitation table for a mobile device or system. FIG. 5 is provided for illustration and data describing the functional limitations of a mobile device may be structured in various ways on the mobile device or system, and may be stored in one or more locations depending on, for example, the type of function involved or the source of the request for the function. In some embodiments, data regarding a function may be in the form of a white list (indicating context in which the function is allowed) or in the form of a black list (indicating context in which the function is not allowed).

In this illustration, certain functions 502 of a mobile device may be limited depending upon the various context elements. In some embodiments, certain limitations may be set by default or may be a part of a group of the settings for the mobile device. The illustrated context elements are the class of operation of the mobile device 504 (such as business or personal use); an unknown physical location 506 (such as when location determining hardware is unable to determine a physical location, which may be because, for example, a GPS signal cannot be received); certain restricted locations for the function 508; certain restricted circumstances for the function 510; limitations of the device when the device is in motion such as motion above a certain velocity 512 (when operation in a moving vehicle may be presumed); and whether the function may be limited when a specific prohibition signal is received 514. Other context elements may include time of day or date, in which certain functions may be limited at certain times or dates, and external conditions experienced by the mobile device, such as temperatures and sharp movements, which may result in limitation of certain functions.

In some embodiments, certain limitations based on the contact may be applied for certain functions. For example, a camera function 520 may be allowed only for personal operations; may be prohibited if the physical location is unknown; might be prohibited or only allowed with restrictions in certain work locations; might be allowed in motion; and prohibited if a prohibition signal is received. In another example, text messaging 522 might be prohibited in automobile driving, and may be prohibited in motion over a certain speed (because the user may be driving) unless a waiver screen is passed indicating that the user is not operating a motor vehicle (as when the user is a motor vehicle or public transportation passenger). In another example, the ringer 524 for the mobile device be disabled in certain known locations (such as a theater and a church) and may be disabled in office meeting circumstances. The table 500 may include other functions as well, shown as Function 4 through Function 7 526-534.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) for execution by one or more processors to perform a process according to the embodiments of the present invention. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

The invention claimed is:

1. A method comprising:
receiving a request for a function of a mobile device;
obtaining data regarding a context of the mobile device, the data including data regarding a physical location of the mobile device;
determining a current context for the mobile device based on the obtained data, wherein the determination of the current context of the mobile device includes circumstances of operation of the mobile device and a class of operation of the mobile device, and wherein the circumstances of the operation of the mobile device are based at least in part on the physical location of the mobile device;
determining whether the function of the mobile device should be limited based at least in part on the current context of the mobile device, wherein determining whether the function should be limited includes accessing data in a memory regarding functional limitations for the mobile device based at least in part on the current context of the mobile device; and
responding to the request for the function based on the determination regarding the limitation of the function, wherein responding to the request for the function includes one of allowing the function, disabling the function, and allowing the function with one or more restrictions in operation.

2. The method of claim 1, wherein the circumstances of operation of the mobile device are further based on a velocity of motion of the mobile device.

3. The method of claim 1, wherein the current context includes whether the mobile device is located in a restricted location for the function.

4. The method of claim 1, wherein a class of operation of the mobile device includes one of a business operation or a personal operation for the mobile device.

5. The method of claim 1, wherein obtaining data further includes receiving an external broadcast signal instructing a limitation on a function of the mobile device.

6. A mobile device comprising:
a processor to process a request for a first function of a plurality of functions of the mobile device, the processor to obtain contextual information about the mobile device and to determine a current context of the mobile device based on the contextual information, wherein the determination of the current context of the mobile device includes circumstances of operation of the mobile device and a class of operation of the mobile device;
a memory to hold data regarding functional restrictions of the mobile device, the processor to access the functional restrictions of the mobile device to determine whether to limit the requested first function based at least in part on the current context of the mobile device, the processor to respond to the request based on the determination regarding limitation of the first function, wherein responding to the request for the first function includes one of allowing the first function, disabling the first function, and allowing the first function with one or more restrictions in operation; and
a location determination element to determine a physical location of the mobile device, wherein the circumstances of operation of the mobile device are based at least in part on the physical location of the mobile device.

7. The mobile device of claim 6, wherein the location determination element includes a global positioning satellite (GPS) element.

8. The mobile device of claim 6, wherein the location determination element utilizes detection of a particular wireless network in the determination of the physical location.

9. The mobile device of claim 6, wherein the data regarding functional restrictions includes a table, the table providing limitations for a plurality of mobile device functions.

10. The mobile device of claim 6, further comprising a camera element, wherein the first function is a photographic function.

11. The mobile device of claim 6, further comprising an audio element, wherein the first function is a sound function produced by the audio element.

12. A mobile system comprising:
a transmitter to transmit signals and a receiver to receive signals;
a dipole antenna to receive and transmit signals;
a processor to process a request for a first function of a plurality of functions of the system, the processor to obtain contextual information about the system and to determine a current context of the system based on the contextual information, wherein the determination of the current context of the mobile device includes circumstances of operation of the mobile device and a class of operation of the mobile device;
a memory to hold data regarding functional restrictions of the system, the processor to access the functional restrictions of the system to determine whether to limit the requested first function based at least in part on the current context of the system, the processor to respond to the request based on the determination regarding limitation of the first function, wherein responding to the request for the first function includes one of allowing the first function, disabling the first function, and allowing the first function with one or more restrictions in operation; and
a location determination element to determine a physical location of the mobile device, wherein the circumstances of operation of the mobile device are based at least in part on the physical location of the mobile device.

13. The system of claim 12, wherein the data regarding functional restrictions includes a table, the table providing limitations for the plurality of system functions.

14. A non-transitory computer-readable storage medium having stored thereon data representing sequences of instructions that, when executed by a processor, cause the processor to perform operations comprising:
receiving a request for a function of a mobile device;

obtaining data regarding a context of the mobile device, the data including data regarding a physical location of the mobile device;

determining a current context for the mobile device based on the obtained data, wherein the determination of the current context of the mobile device includes circumstances of operation of the mobile device and a class of operation of the mobile device, and wherein the circumstances of the operation of the mobile device are based at least in part on the physical location of the mobile device;

determining whether the function of the mobile device should be limited based at least in part on the current context of the mobile device, wherein determining whether the function should be limited includes accessing data in a memory regarding functional limitations for the mobile device based at least in part on the current context of the mobile device; and responding to the request for the function based on the determination regarding the limitation of the function, wherein responding to the request for the function includes one of allowing the function, disabling the function, and allowing the function with one or more restrictions in operation.

15. The medium of claim 14, wherein the circumstances of operation of the mobile device are further based on a velocity of motion of the mobile device.

16. The medium of claim 14, wherein the cuffent context includes whether the mobile device is located in a restricted location for the function.

17. The medium of claim 14, wherein a class of operation of the mobile device includes one of a business operation or a personal operation for the mobile device.

18. The medium of claim 14, wherein obtaining data further includes receiving an external broadcast signal instructing a limitation on a function of the mobile device.

* * * * *